United States Patent [19]

Hudak

[11] 4,375,626

[45] Mar. 1, 1983

[54] PRECISION LINEAR TUNING CIRCUIT

[75] Inventor: John J. Hudak, Columbia, Md.

[73] Assignee: The United States of America as represented by the National Security Agency, Washington, D.C.

[21] Appl. No.: 276,143

[22] Filed: Jun. 22, 1981

[51] Int. Cl.³ .............................................. H03J 3/20
[52] U.S. Cl. ..................................... 334/79; 334/82; 361/278; 361/292
[58] Field of Search ...................... 334/78, 79, 80, 82; 333/99 S; 361/276–278, 287, 292

[56] References Cited

U.S. PATENT DOCUMENTS 1,568,274  1/1926  Grimes .
1,708,764  4/1929  Klein .
1,733,337  10/1929  Deutscher .
3,214,655  10/1965  DiGiacomo ................. 361/276 X
3,555,467  1/1971   Johnson .
3,702,957  11/1972  Wolfendale .

Primary Examiner—Paul L. Gensler
Attorney, Agent, or Firm—John R. Utermohle; Thomas O. Maser

[57] ABSTRACT

A precision linear tuning circuit having particular utility to applications employing superconductors in a supercooled environment. Two capacitors, one fixed and one variable, are connected in parallel by an arrangement of shared, concentric electrodes. The variable capacitor includes one electrode and a movable facing dielectric which are tapered such that displacement of the dielectric results in a linear variation in tuning frequency.

5 Claims, 7 Drawing Figures

PRECISION LINEAR TUNING CIRCUIT

BACKGROUND OF THE INVENTION

1. Field of the Invention

My invention relates to the field of electrical tuned circuits, and more specifically to a circuit in which precision linear tuning is accomplished by varying the value of circuit capacitance.

2. Description of the Prior Art

It is common to provide tuning for a circuit by connecting some form of capacitance either in series or in parallel with some form of inductance, the combination being used as a critical part of the functional circuit. Tuning is accomplished by adjusting either the capacitance or inductance, or both, which alters the resonant frequency of the combination. Practical difficulties arise with this arrangement when the application requires tuning over a very wide frequency range while simultaneously demanding that the frequency be adjusted to high precision. One type of previously known tuning circuit includes a single capacitor which must be controlled with high precision. Exact control might be made possible through use of a physically large capacitor or with a high resolution mechanical system capable of precision movement of the electrodes or dielectric of the capacitor. Precision must often be provided by differential screws, optical encoded shafts or laser position monitors. The physical size of the capacitor or the mechanical precision necessary to tune it is determined by the highest degree of tuning resolution required in the circuit. However, because tuning resolution normally varies over the tuning range, any circuit must be designed such that the poorest resolution achieved is sufficiently good to meet the requirements of the circuit. As a result, the physical size of the capacitor or the mechanical precision of the system must often be unnecessarily large over almost all of its tuning range. An alternative scheme uses two or more independently variable capacitors which provide various degrees of coarse and fine adjustment. The additional mechanical linkages increase cost, size and the complexity of the system. Both of the above approaches are still further complicated if expected vibrations in the intended environment will produce continuous variations in capacitance which exceed the tuning resolution requirements. Yet another alternative is to use a number of separate circuits, each covering a portion of the desired frequency range. This results in duplication and increases cost and complexity of the system.

Any electrical circuit necessarily includes some undesired resistance losses which may degrade circuit performance. In some applications it is desirable to make these resistive losses as low as possible. It is well known that this can be achieved by fabricating the circuit from materials which become superconducting when cooled to temperatures near absolute zero. In particular, nearly lossless AC circuits having extraordinarily high Q's can be obtained. Because of the extreme brittleness exhibited by most superconductors at these temperatures the "supercooling" of electrical circuits leads to problems when flexible lossless electrical connections are required. Circuits have been designed which completely eliminate the need for moving electrical contacts or connectors, however, these circuits have failed to provide a highly desirable linear relationship between the frequency range to be scanned and the capacitor adjustment mechanism.

An important means for providing cooling for superconducting devices is the immersion of the device in a bath of liquid helium. For practical applications efficient long hold time liquid helium dewars are used which are carefully designed to minimize heat flow into the cryogenic environment. Such dewars are capable of holding a supply of helium for four months or longer before a refill is required. In applications which require the use of many cables or mechanical linkages, the heat leak down these connections can quickly exceed the heat leak into the dewar alone and severly limit the hold time of the dewar. In these cases closed cycle refrigerators must be used to extract the heat which leaks down the connections. Use of refrigerators can cause vibrational, electrical and magnetic interference harmful to device performance. Use of this invention to minimize the number of linkages to the device will provide important reductions in the amount of heat leakage and thus significantly extend the hold time or even eliminate the need for a refrigerator.

My invention includes a novel combination of a fixed capacitor in parallel with a variable capacitor, the combination of which when added in series or in parallel with an inductance, results in a tuned circuit in which the resonant frequency is directly proportional to the displacement of the dielectric in the variable capacitor.

SUMMARY OF THE INVENTION

My invention grew out of the need for a precision linear tuning circuit intended for use in a superconducting environment where the number of linkages is limited by space and reliability considerations, and where the highest circuit Q must be obtained. Further constraints result from the vacuum environment necessary for thermal isolation, which also makes multiple ports for mechanical controls undesirable. The substantial vibrations produced by a cryogenic refrigeration system substantially degrades the tuning precision of previously known circuits. The cryogenic environment makes moving electrical contacts highly undesirable because of the tendency of superconductors at such low temperatures to be brittle and break, and makes sliding contacts similarly undesirable because of the increased resistance which normally results. In applications in which long hold time helium dewars are to be used the reduction in the number of mechanical linkages will result in an significant increase in hold time. Finally, the need to obtain a very high Q makes relatively low-Q devices such as varactor diodes unsuitable for tuning. There is a need for a precision linear tuning circuit which overcomes the many disadvantages of the prior art.

Accordingly, it is an object of my invention to provide a tuning circuit in which frequency is proportional to displacement of the capacitor dielectric.

It is a further object to provide a circuit having linear tuning over a very wide frequency range.

Another object is to provide a lossless tuning circuit suitable for use with very high Q superconducting circuits.

A still further object is to provide a tuning circuit suitable for use in a cryogenic environment.

Yet a further object is to provide a linear tuning circuit requiring a single mechanical linkage.

It is also an object to provide a tuning circuit having no moving electrical contacts.

Still another object is to provide a vibration resistant tuning circuit.

Yet another object is to provide a tunable circuit having the above mentioned properties which is designed for ease of fabrication.

An apparatus having these and other desirable characteristics would include (1) a variable capacitor comprising a first electrode fixed on an axis, a second electrode fixed concentrically about said first electrode such that the facing walls of the electrodes define a gap therebetween, and a dielectric movably positioned concentrically within the gap between said first and second electrodes, the facing walls of one electrode and the dielectric being tapered relative to said axis and the facing walls of the other electrode and the dielectric being untapered relative to said axis, and (2) a fixed capacitor electrically connected in parallel with said variable capacitor.

BRIEF DESCRIPTION OF THE DRAWINGS

My invention may be best understood by carefully reading the following description together with the drawings, in which.

DESCRIPTION OF THE PREFERRED EMBODIMENTS

Figure 1A:
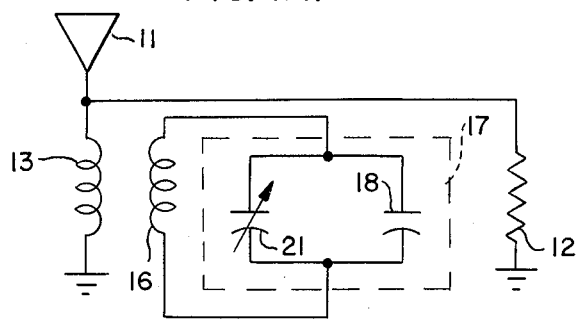
FIGS. 1A–1C are schematic diagrams of representative tunable circuits including my invention.
Figure 1B:
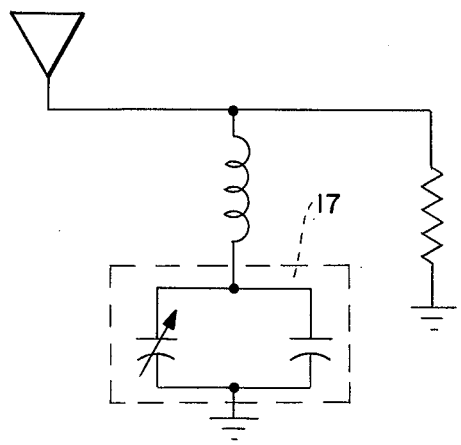
Figure 1C:
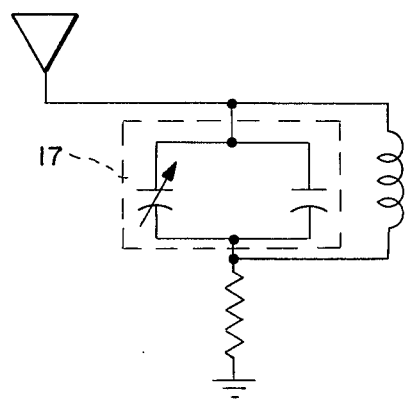

Referring to FIG. 1A, there is illustrated a schematic diagram of a circuit including a notch filter. Radio signals received on an antenna 11 are provided to a radio receiver, represented by load 12. The notch filter includes a first coil 13 inductively coupled to a tank circuit including a second coil 16 and a capacitor bank 17. Capacitor bank 17 includes a fixed capacitor 18 in parallel with a variable capacitor 21. Selecting the desired frequency to be filtered involves varying the value of capacitor 21 in order to make the circuit resonate at the desired frequency. FIGS. 1B and 1C show alternative circuits in which the capacitor bank 17 of FIG. 1A might be advantageously used in a filter. The theory of operation of notch filters is well known and will not be further described.

Figure 2:
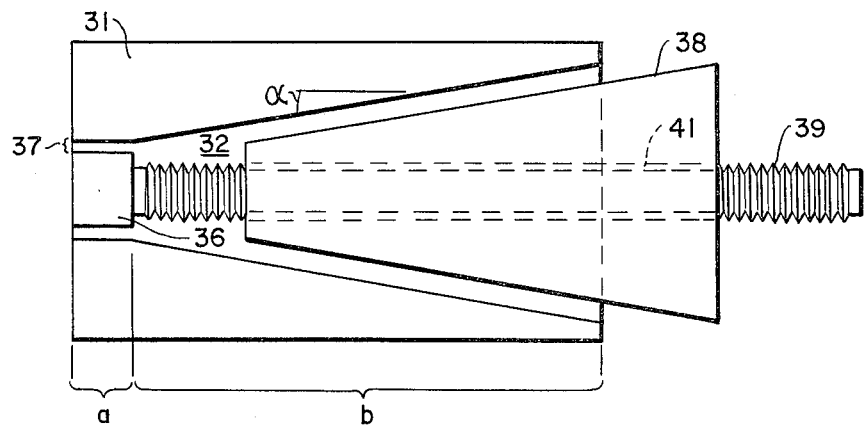
FIG. 2 illustrates a preferred embodiment of a variable and fixed capacitor for use in my invention.
Figure 3:
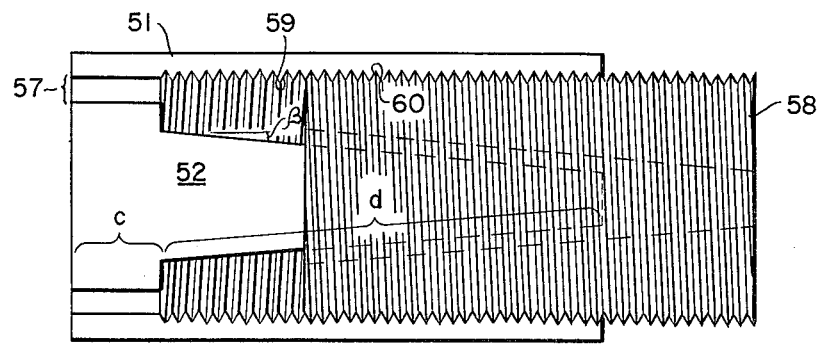
FIG. 3 illustrates an alternative embodiment of a variable and fixed capacitor for use in my invention.

FIGS. 2 and 3 illustrate two embodiments of a capacitor bank suitable for use in my invention. Each includes a pair of fixed electrodes spaced apart to define a gap between them, and a dielectric positioned for movement within the gap.

Referring first to FIG. 2, there is seen a simplified cross-sectional view of a parallel combination of a fixed and a variable capacitor. It includes a first electrode 31, the outer surface of which has the shape of a right circular cylinder. An inner portion of electrode 31 has been removed to define a cavity 32 having two distinct segments: a first segment "a" in the shape of a cylinder and a second segment "b" in the shape of the frustrum of a right circular cone. Conical segment b is tapered at an angle $\alpha$, which is discussed further below. A second electrode 36 is positioned coaxially within the cavity of electrode 31 and has generally the shape of a right circular cylinder. The outer diameter of electrode 36 will be less than the inner diameter of that portion of electrode 31 defining segment a of the cavity, such that a gap 37 will exist between the two electrodes. Gap 37 is filled with a dielectric such as air, vacuum or some non-conducting solid, and its size is determined by the desired capacitance.

A solid dielectric 38 is movably positioned within segment b of the cavity and coaxially with the two electrodes. It is precisely shaped with its outer surface tapered at an angle $\alpha$ to produce a conical shape identical to that of segment b of the cavity. Dielectric 38 has a cylindrically shaped cavity extending through its center, the diameter of the cavity being substantially identical to that of electrode 36 such that electrode 36 will fit closely within segment b of cavity 32. By moving dielectric 38 axially along electrode 36, the volume of air space within segment b of cavity 32 will be controllably varied with a corresponding variation in capitance. A substantial improvement in both adjustability and vibration resistance will result if dielectric 38 and inner electrode 36 are provided with screw threads 39. Rotation of dielectric 38 will then cause it to be moved into or out of segment b of cavity 32 for adjustment, and the threads will then inhibit movement of the dielectric relative to the electrodes once a proper capacitance has been achieved. Due to the difficulties of threading the inner cavity of dielectric 38, a more practical embodiment would include a threaded metallic insert 41 permanently secured within the cavity.

The structure illustrated in FIG. 2 provides a parallel combination of fixed and variable capacitors as illustrated by capacitor bank 17 of FIG. 1. The fixed capacitor is provided by that portion of electrode 31 and electrode 36 which encompasses segment a of the cavity, while the variable capacitor is provided by the movable dielectric 38 within that portion of electrode 31 and electrode 36 which encompasses segment b of the cavity. While the capacitance of the fixed capacitor would remain fixed for any given application, it is apparent that the capacitance could be required to vary from one application to another. Hence, in an alternative embodiment the fixed capacitor might be conveniently replaced by an adjustable capacitor set to the desired capacitance and connected in parallel with the variable capacitor contained within segment b.

Referring to FIG. 3, there may be seen a simplified cross-sectional view of an alternative embodiment of a parallel combination of a fixed and a variable capacitor. It includes a first electrode 51, the outer surface of which has the shape of a right circular cylinder. An inner portion of electrode 51 has been removed to define a cavity, also having the shape of a right circular cylinder. A second electrode 52 positioned coaxially within the cavity has a first segment "c" in the shape of a right circular cylinder and a second segment "d" having the shape of the frustrum of a right circular cone. Conical segment d is tapered at an angle $\beta$. The outer diameter of segment c will be less than the inner diameter of electrode 51, such that a gap 57 will exist between the two electrodes. Gap 57 is filled with a dielectric such as air, vacuum or some non-conducting solid, and its size determined by the desired capacitance.

A solid dielectric 58 is movably positioned coaxially within the cavity defined by electrode 51 and segment d. It is precisely shaped with an outer cylindrical surface closely fitted to the inner surface of electrode 51. Within dielectric 58 is a cavity having the shape of the frustrum of a cone with dimensions identical to those of segment d. The cavity is positioned coaxially such that as dielectric 58 is moved to the left it progressively fills the gap between electrode 51 and segment d. At the extreme left-most position, dielectric 58 totally fills the gap and closely abuts both electrode 51 and segment d. The abutting surfaces 59, 60 of electrode 51 and dielectric 58, respectively, may be threaded to provide for adjustability and vibration resistance as was previously explained with respect to the embodiment of FIG. 2. Alternatively, a threaded metallic insert 61 might be secured to the outer surface of dielectric 58 to eliminate the difficulties of threading the dielectric surface itself.

As was the case with the embodiment of FIG. 2, the structure illustrated in FIG. 3 provides the parallel combination of fixed and variable capacitors shown as capacitor bank 17 in FIG. 1. The fixed capacitor 18 is provided by that portion of electrode 51 opposite segment c, segment c, and the intervening dielectric. The variable capacitor 21 is provided by that portion of electrode 51 opposite segment d, segment d, and the intervening movable dielectric 58 and space.

Figure 4:
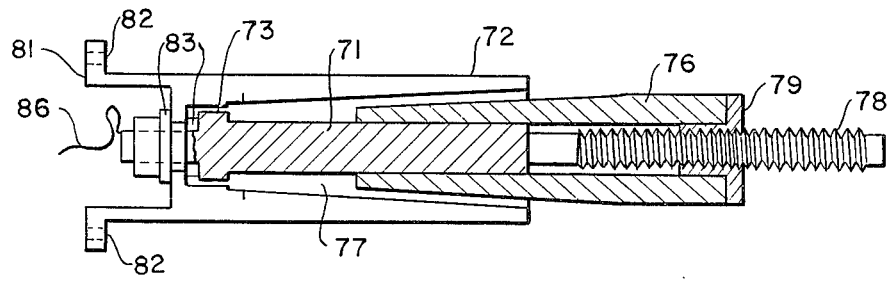
FIG. 4 is a cross sectional view of my invention.

FIG. 4 illustrates the embodiment of FIG. 2 in greater detail, and represents a structure which has been built and tested. An inner electrode 71 and an outer electrode 72 are coaxially positioned with a cavity between them. A first segment 73 of the cavity contains a vacuum, thereby creating a fixed capacitor. A movable dielectric 76 is coaxially positioned such that it may be extended into a second segment 77 of the cavity. Electrode 71 includes a threaded extension 78 which protrudes beyond the end of electrode 72. A similarly threaded bushing 79 is rigidly fixed to dielectric 76 such that rotation of the dielectric causes the dielectric to be inserted into segment 77. A flange 81 includes holes 82—82 through which the apparatus may be bolted into position. A pair of insulators 83, made from nylon or a similar insulating material, isolate electrode 72 from electrode 71 and provide additional rigidity to the structure. A wire 86 is electrically connected to electrode 71 for connection to the remainder of the electrical circuit.

A combination fixed and variable capacitor as shown in FIG. 4 was built for the purpose of testing my invention. Dielectric 76 was fabricated from ceramic rutile with a length of 1.5 inches. Its maximum diameter was 0.648 in. and tapered to a minimum diameter of 0.309 in. The dielectric constant $\epsilon$ was 114 at 4° K., and the taper angle $\alpha$ was 0.029 radians or $1\frac{2}{3}°$. The fixed capacitance was adjusted to 4.11 pf.

Figure 5:
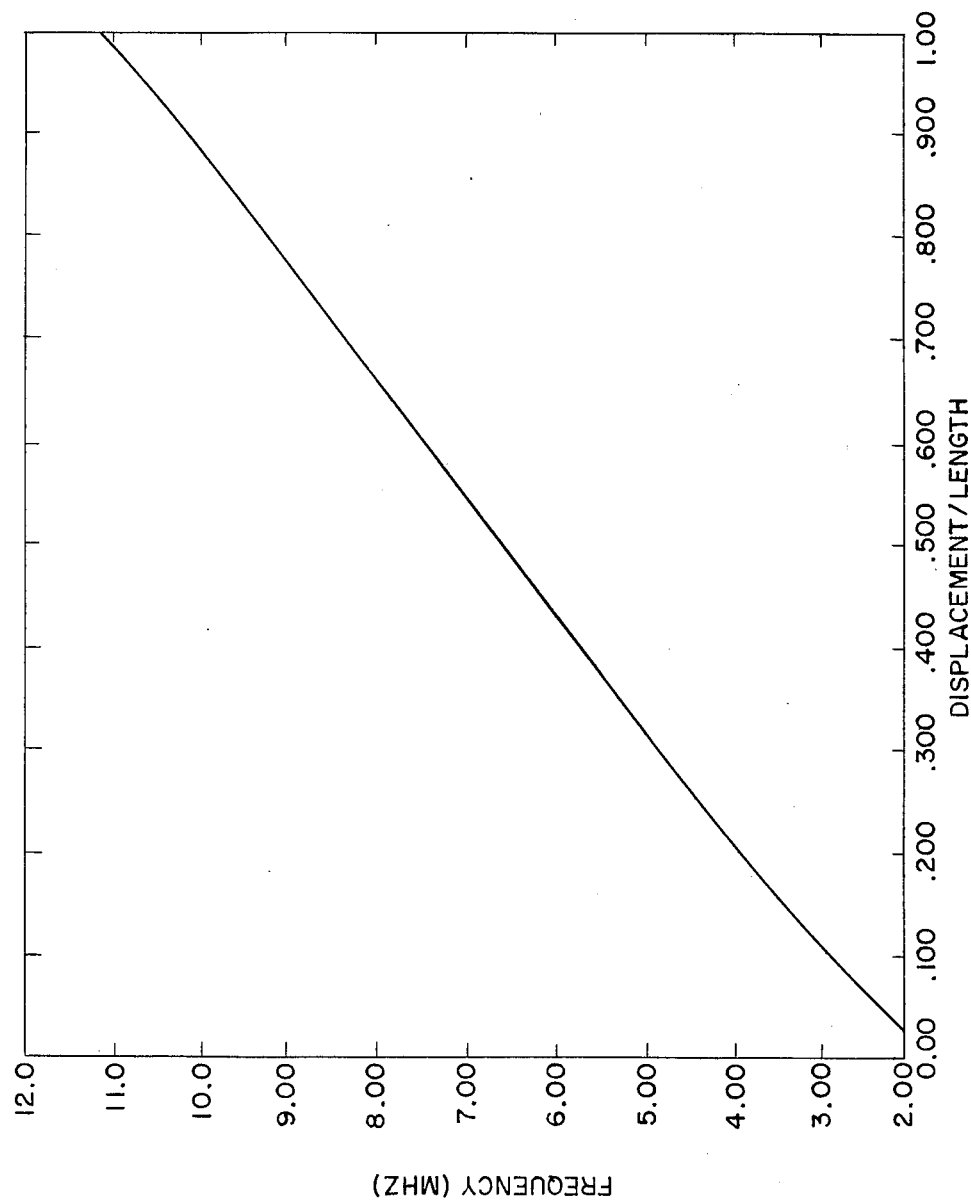
FIG. 5 is a graphical representation of a frequency vs. displacement curve for the embodiment of FIG. 4.

Capacitance values of the device were carefully measured over the entire range of adjustment at room temperature, and these values were mathematically reduced to their expected values at 4° K. These values were then provided to a compterized mathematical model which further included an inductance (coil 16 of FIG. 1) of 29.6 $\mu$H. Test results are indicated in the graph of FIG. 5, which shows a high degree of linearity over a frequency range of 3-11 MHz, nearly two octaves.

I claim:

1. An electrical circuit wherein tuning is achieved by varying circuit capacitance comprising:
   a variable capacitor, comprising:
   a first electrode fixed on an axis;
   a second electrode fixed concentrically about said first electrode such that the facing walls of the electrodes define a gap therebetween, and
   a dielectric movably positioned concentrically within the gap between said first and second electrodes, the facing walls of one electrode and the dielectric being tapered relative to said axis and the facing walls of the other electrode and the dielectric being untapered relative to said axis, and
   a fixed capacitor electrically connected in parallel with said variable capacitor.

2. The apparatus of claim 1 wherein said fixed capacitor comprises:
   an untapered extension of said first electrode;
   an untapered extension of said second electrode fixed concentrically about the extension of the first electrode such that the facing walls of the extensions define a gap therebetween, and
   a dielectric fixedly positioned concentrically within the gap between said first and second extensions.

3. The apparatus of claim 1 wherein said first electrode is untapered, the inner surface of said second electrode is tapered, and the outer surface of said dielectric is tapered.

4. The apparatus of claim 1 wherein said second electrode is untapered, the outer surface of said first electrode is tapered, and the inner surface of said dielectric is tapered.

5. The apparatus of claim 1 wherein said untapered facing walls of said dielectric and electrode are threaded.

* * * * *